Sept. 7, 1965 W. R. DICKIE 3,205,299
CONDUCTIVE CONNECTOR
Filed March 3, 1961

INVENTOR.
WILLIAM R. DICKIE
BY Angus & Mon
ATTORNEYS.

3,205,299

CONDUCTIVE CONNECTOR

William R. Dickie, Manhattan Beach, Calif., assignor to Hi-Shear Corporation, Torrance, Calif., a corporation of California Filed Mar. 3, 1961, Ser. No. 93,129
5 Claims. (Cl. 174—84)

This invention relates to means for conductively and structurally connecting a pair of members without the use of heat.

There are many electrical connections which have to be made without heat, and with a minimum of bulk, particularly in connection with miniaturized devices. Heat cannot be used because even a small quantity will be too great for the small structure to absorb without damage. Crimped connections are unsuitable because they add weight and increase the envelope size. Therefore, it is necessary to find some means for joining these members with means which are themselves very small, and which need only pressure to make the joint. Attempts have been made to conductively join members by use of conductive solders, but these have not been a success because the conductivity of the solder is variable and unpredictable. This is for the reason that the conductivity is derived from powdered metal, which is suspended in a non-conductive matrix such as an epoxy resin. The interconnection of the powder particles is a random matter, and might or might not occur at all, or might occur in varying degrees, so that the resistance across a given bond is neither predictable nor reliable. Therefore, adhesive techniques have not heretofore been considered practical.

It is an object of this invention to provide a conductive tape which is adhesively adherent to the surfaces to be joined, and which includes provisions for conductivity across the tape.

The tape includes a strip of flexible metal foil which carries on each of its faces a metal contactor which is in conductive contact with the foil itself, and which rises to a height above the face. A layer of adhesive is also provided on said face adjacent to the contactor, this layer having a thickness no greater than the said height.

According to a preferred but optional feature of the invention, the contactors comprise metal particles adherent to the adhesive layers, these particles having least dimensions not less than the thickness of the respective adhesive layer and which are spaced apart from each so that some adhesive surfaces remain bare of said particles. When a piece of tape is placed between a pair of surfaces and the surfaces are pressed together, the particles are pressed into contact with at least one surface and with the foil. The foil will bend and otherwise accommodate itself to the extent that the adhesive layers bear against and adhere to the said two surfaces, and thereby serve to hold the two members bonded to the tape, with the tape making a conductive interconnection through the particles touching one of the surfaces, through the foil, and then through particles touching the other of said surfaces.

The above and other features of this invention will be fully understood from the following detailed description and the accompanying drawings in which.

The connector means according to this invention has a wide variety of applications in making electrical connections, but there is one application in which it outperforms and is less expensive than any known device or technique. This is in connection with the well-known multiple conductor tapes such as tape 20 in FIGS. 1–3. Such tapes commonly include a plurality of conductors 21, 22 of foil thickness, which are usually made of copper or silver, sandwiched between a pair of layers 23, 24 of plastic sheet which are sealed together to insulate the conductors from each other and from the surroundings. This invention will be demonstrated in connection with applying terminal lugs 25, 26 to ends of the conductors from which the insulation has been removed.

Figure 2:
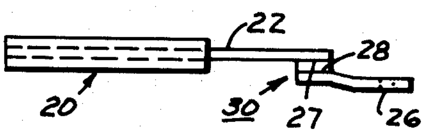
FIG. 2 is a bottom view of FIG. 1.

As can best be seen in FIG. 2, conductor 22, which will be selected as the example, has a lower surface 27, and lug 26 has an upper surface 28, which are to be conductively interconnected so a circuit can be made from conductor 22 to terminal 26. To carry this out, a connector 30, according to this invention, is placed between the two surfaces and the two surfaces are pressed firmly against it to establish a conductive and structural connection as hereafter described.

Figures 3, 4, 5, 6, 7, 8, 9:
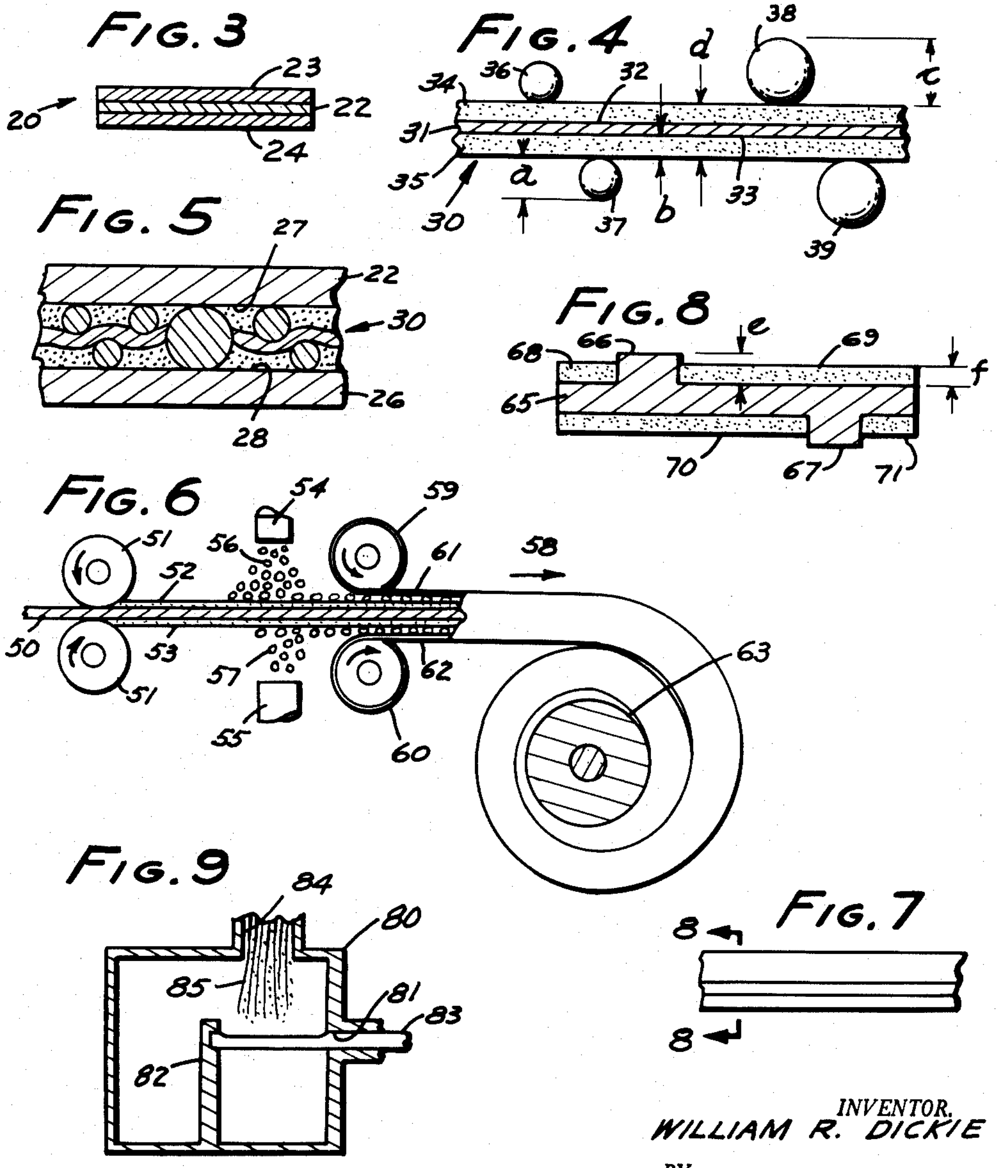
FIG. 3 is a cross-section taken at line 3—3 of FIG.1.
FIG. 4 is a cross-section of the presently preferred embodiment of tape according to the invention.
FIG. 5 shows the tape of FIG. 4 mounting two members together.
FIG. 6 shows the technique of manufacturing the device of FIG. 4.
FIG. 7 is a plan view of an alternate embodiment of the invention.
FIG. 8 is a cross-section taken at line 8—8 of FIG. 7.
FIG. 9 is a cross-section showing means and apparatus for stripping the insulation from the tape of FIG. 1.

The nature of the connector and its method of manufacture will best be understood by initial reference to FIGS. 4–6. In FIG. 4, the connector is shown in its condition before being pressed together between the surfaces. It includes a central foil strip or sheet 31 which is made of conductive metal, preferably silver. On each of faces 32, 33 of this strip, there are respectively placed layers 34, 35 of adhesive material. The layers of adhesive material have a thickness *b*. The thickness of the adhesive layers relative to that of the foil could be greater or less than shown. It will be understood that while these layers will conveniently be made of the same thickness, this is not a limitation on the invention. There are many suitable adhesives for the purpose. A suitable one is sold under the trademark PS18 by Metal Cals, a product of C & H Supply Company, 415 E. Beach Avenue, Inglewood, California.

To these surfaces of the adhesive layers, there are applied a plurality of contactors in the form of metal particles 36, 37, 38, 39 of which four examples are given. For convenience, these contactors are shown as spheres although it is to be understood that the particles could be made of any desired configuration which might be derived from turnings, chips, randomly shaped pieces, or other geometric shapes.

The metal particles have the characteristic that their least dimension *a* is at least as great as the thickness *b* of the layer to which they are adherent and they may be greater. For example, particles 36 and 37 are of a size that their least dimension is at least as great, and in fact is preferably somewhat greater than dimension *b*.

Particles 38 and 39 are much larger than particles 36 and 37 and have a least dimension *c* which is greater than both dimension *b* and dimension *d*, the latter being the total thickness of the foil strip and the two layers of adhesive. In this case, the dimension *c* is somewhat greater than *d* and illustrates an approach to the largest dimension the particles should have. It is desirable for the largest dimension of the particles to be not so much greater than the thickness *d* that contact of the adhesive layers with the surfaces is prevented over a very extensive layer. Of course, this is partly a function of how far apart the contactors are spaced. The most contactors per unit area on both sides can be provided when the contactor's greatest dimension is less than about ½d.

In defining the lesser and greater dimensions of the contactors herein, it is to be understood that these dimensions relate to those dimensions which tend to align themselves normal to the foil surfaces. As an example, consider a rectangular parallelipiped having three dimensions *a*, *b* and *c* in which *b* is greater than *a*, and *c* is greater than *b*. It is conceivable that dimension *c* would be such as to align itself with the foil and then either dimensions *a* or *b* would tend to stand above the foil surface. It is the surface likeliest to stand above the surface of the foil which is referred to herein as the least dimension, in this case *a*. However, as to the greatest dimension, it could be either *b* or *c*, depending on the alignment. A sphere, of course, represents a more predictable situation. The least and greatest dimensions are equal.

In denoting strip or sheet 31 as "foil" in the specification and claims, it is intended to convey that in most applications, thicknesses ordinarily thought of as foil thickness, are ordinarily sufficient; that is, of the order of 0.0015–0.006 inch. However, the term is also intended to include all strips sufficiently flexible to function as described above which, for soft materials or very flexible materials, could be as great as 1/16 inch or so.

FIG. 5 illustrates the behavior of the metal particles when the device is pressed between surfaces 27 and 28. It will be noted that the distribution of the particles over the surfaces is a random one, so that as the surfaces are pressed together, the particles are imbedded in the adhesive layer and deform or even pierce the foil. Particles 36 and 37 have deformed the foil without piercing it. They make contact with it, and are in contact with the surfaces which press them in. Particle 38 has pierced the foil strip, and is in contact with both surfaces.

The adhesive is shown as having cold flowed to fill in the spaces between the contactors. This would occur when the adhesive is initially soft. Some adhesives will not flow, in which event the adhesive would not adhere to all portions of the surfaces not contacted by the contactors, but instead would make only intermittent contact with the surfaces. Nevertheless, this will ordinarily provide a very adequate bond between the contactors and the surfaces, and firmly hold all elements bonded together.

A technique of manufacturing the connector tape of FIG. 4 is shown in FIG. 6. A strip of metal foil 50 is fed between two rolls or calenders 51 which apply layers 52, 53 of adhesive. These layers then pass beneath chutes 54, 55 from which particles 56, 57 are sprinkled or otherwise applied to the adhesive. They stick to the adhesive. It is at this point that care must be taken that the adhesive surface is not entirely covered by these particles lest the adhesive be unable to contact the metal over a sufficient area to make a good joint. Also the particles should be spaced far enough apart that the foil and adhesive layers can bend sufficiently to make contact with the adjoining surfaces, particularly when a nonflowing adhesive is used.

From the chutes, the tape passes in the direction shown by arrow 58 between rolls 59, 60, which apply paper backing 61, 62, which will protect the material from itself so that it can be rolled up on a core 63. It will be understood that the particles may be at least partially or entirely forced into the adhesive by this action, or remain as illustrated, merely on top; it is immaterial.

FIG. 8 illustrates still another embodiment of the invention in which a foil strip 65 is provided with a pair of bosses 66, 67 that are laterally spaced apart from each other and which rise to a height *e* about the surface of the foil strip. These heights could, of course, be different from each other but will usually be equal. Layers 68, 69, 70, 71 of adhesive material are laid atop the strip on each side of the respective bosses to a height *f*, *e* being greater than *f*. In use, it will be observed that the bosses will act as contactors the same as the metal particles and that the foil will bend to enable the adhesive layers to make a firm contact with the surfaces, their adhesive action serving to hold the bosses firmly against the surfaces.

Figure 1:
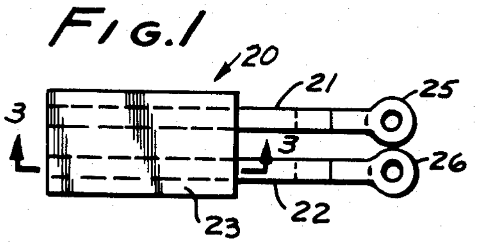
FIG. 1 is a plan view of a flexible multi-conductor tape showing the invention connecting terminal lugs thereto.

Particularly in dealing with tapes, such as tape 20 of FIG. 1, it is often found difficult to quickly and effectively strip the plastic insulation off the conductors and also to remove an oxide coating on the conductors which is frequently present, to provide additional insulation. FIG. 9 illustrates a technique for this purpose, in which a box 80 has a slit 81 in one of its sides and a clamp 82 inside. A strip 83 of tape may be fed through the slit and into the clamp beneath a sandblasting nozzle 84 from which sand 85 issues at a suitable velocity so as to selectively abrade away the plastic layers and the oxide layer, and leave the metal conductor clean and bare. The velocity and hardness of the grits are appropriately selected for this purpose.

This invention thereby provides a tape which is useful even in small pieces to join terminals and the like to ends of fragile conductors by application of pressure. It is also suitable for larger surfaces and elements, being of utility wherever an adhesive bond is sufficient.

This invention is not to be limited by the embodiments shown in the drawings and described in the description which are given by way of example and not of limitation, but only in accordance with the scope of the appended claims.

I claim:

1. Connector means conductively and structurally connecting two surfaces, one on each member of a pair of members, comprising: a strip of metal foil; a layer of adhesive material on each face of the foil, the adhesive being adherent to both foil and the surfaces, said layers each having a dimension of thickness; and a plurality of conductive metal contactors in the form of particles on each of said layers, said particles having a least dimension not less than the dimension of thickness of its respective layer, the particles being spaced apart from each other so that some adhesive surfaces remain bare of said particles, the greatest dimension of the particles being such as to permit contact of adhesive with a surface adjacent to the particles, said connector means being disposed between the said two surfaces and electrically and structurally interconnecting the same with the said particles in conductive contact with one face of said strip and one of said two surfaces, the adhesive layers adhering to the surfaces to maintain the said connection.

2. Connector means according to claim 1 in which the said least dimension of the contactors is at least as great as the total thickness of the foil and the two layers of adhesive material.

3. Connector means according to claim 1 in which the contactor particles are made of a metal comprising silver.

4. Connector means for conductively and structurally connecting two surfaces, one on each member of a pair of members, comprising: a strip of conductive metal foil; a pair of laterally spaced apart bosses on opposite faces of the foil, each rising to a dimension of height above the respective foil faces; and a layer of adhesive material adjacent to each of the bosses rising to a height less than the thickness of its respective boss, whereby sandwiching the connector means between the surfaces with the surfaces bearing against the bosses, and pressing the surfaces toward each other, moves the adhesive layers into contact with the surfaces to join them together, the bosses conductively interconnecting the surface and the foil.

5. In combination, a pair of conductive members to be interconnected, each of said members having a surface; and connector means joining said surfaces conductively and structurally together, said connector comprising: a strip of flexible metal foil having a pair of faces; a metal contactor in conductive contact with each face of the foil and rising to a height above its respective face; and a layer of adhesive on each said face adjacent to the contactor and having a thickness no greater than the said height, said connector means being sandwiched between said surfaces, each contactor electrically interconnecting one face of the foil and one of said surfaces and the adhesive holding said surfaces in conductive contact with the metal contactors.

References Cited by the Examiner

UNITED STATES PATENTS

| | | | |
|---|---|---|---|
| 1,610,927 | 12/26 | Butler | 51—319 |
| 2,584,031 | 1/52 | Lander | 51—319 |
| 2,808,352 | 10/57 | Coleman et al. | 117—122 X |
| 2,965,699 | 12/60 | Bollmeier | 174—84 |
| 3,025,339 | 3/62 | Gordon et al. | 174—84 |

DARRELL L. CLAY, *Primary Examiner.*

BENNETT G. MILLER, JOHN P. WILDMAN, E. JAMES SAX, *Examiners.*